(No Model.) 5 Sheets—Sheet 1.
J. T. TODD.
RECORDER.
No. 499,610. Patented June 13, 1893.
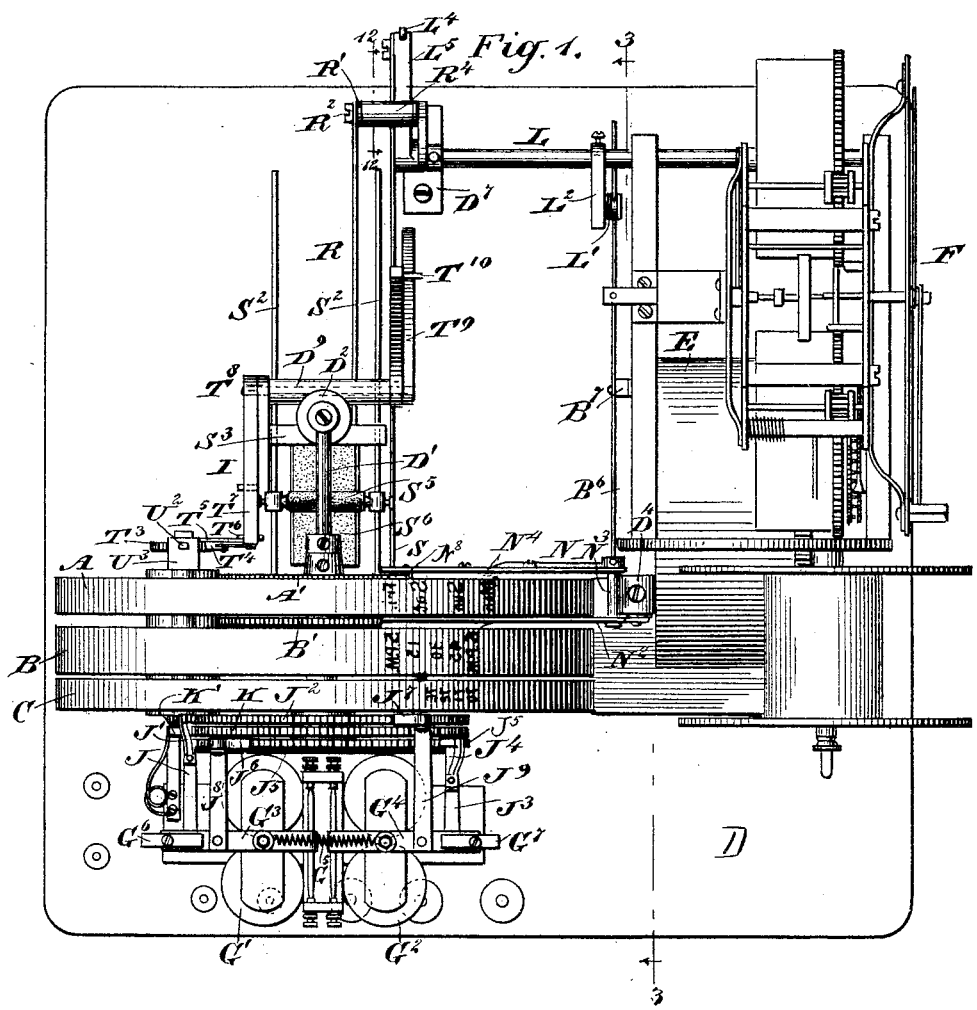
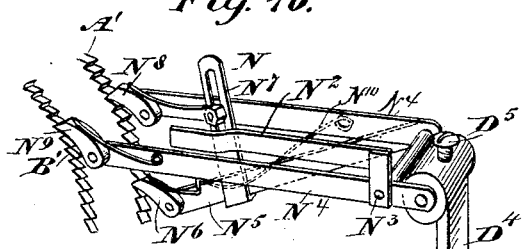
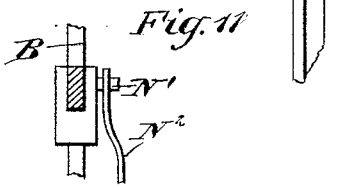
WITNESSES:
J. E. Criswell
C. Sedgwick
INVENTOR
J. T. Todd
BY Munn & Co.
ATTORNEYS.

(No Model.)  5 Sheets—Sheet 2.

J. T. TODD.
RECORDER.

No. 499,610. Patented June 13, 1893.

WITNESSES:
J. E. Criswell
C. Sedgwick

INVENTOR
J. T. Todd
BY Munn & Co
ATTORNEYS.

THE NORRIS PETERS CO., PHOTO-LITHO., WASHINGTON, D. C.

(No Model.) 5 Sheets—Sheet 3.

J. T. TODD.
RECORDER.

No. 499,610. Patented June 13, 1893.

WITNESSES:
J. A. Criswell
C. Sedgwick

INVENTOR
J. T. Todd
BY Munn & Co
ATTORNEYS.

(No Model.) 5 Sheets—Sheet 4.
J. T. TODD.
RECORDER.
No. 499,610. Patented June 13, 1893.
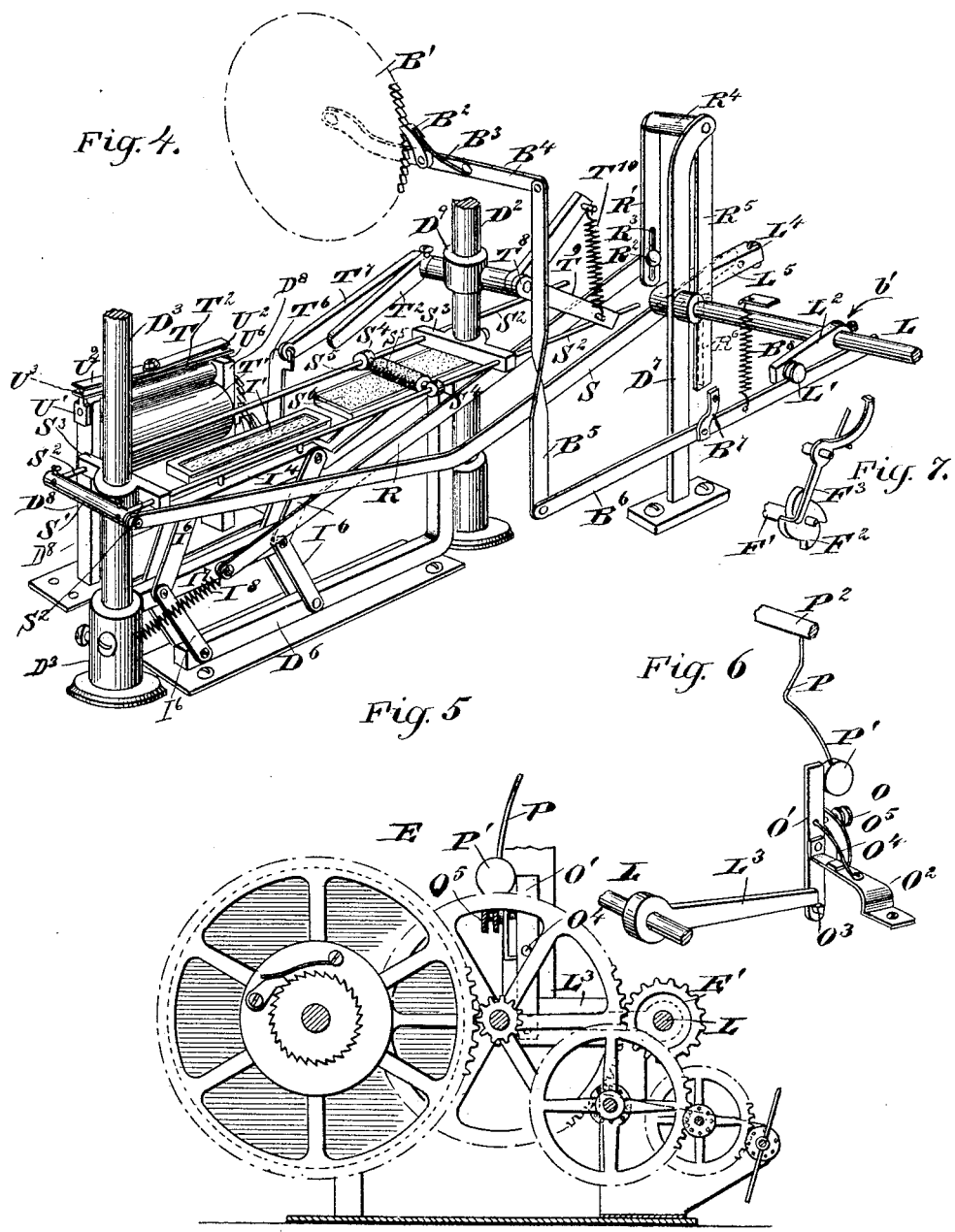
WITNESSES: INVENTOR
J. A. Criswell J. T. Todd
C. Sedgwick BY Munn & Co
ATTORNEYS.

(No Model.) 5 Sheets—Sheet 5.

J. T. TODD.
RECORDER.

No. 499,610. Patented June 13, 1893.

WITNESSES:
C. Sedgwick
E. M. Clark

INVENTOR
J. T. Todd
BY Munn & Co
ATTORNEYS.

UNITED STATES PATENT OFFICE.

JOHN T. TODD, OF NEWMAN, ASSIGNOR, BY DIRECT AND MESNE ASSIGNMENTS, TO THE TODD APPLEGATE COMPANY, OF CHICAGO, ILLINOIS.

RECORDER.

SPECIFICATION forming part of Letters Patent No. 499,610, dated June 13, 1893.

Application filed May 24, 1892. Serial No. 434,184. (No model.)

*To all whom it may concern:*

Be it known that I, JOHN T. TODD, of Newman, in the county of Douglas and State of Illinois, have invented a new and Improved Telemeter, of which the following is a full, clear, and exact description.

The object of the invention is to provide a new and improved telemeter designed to automatically record for any desired length of time and at regular predetermined intervals the state or variations of any force, whether the variations are of temperature, pressure, or other changing agent occurring in any locality, machine, or apparatus.

The invention consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 2:
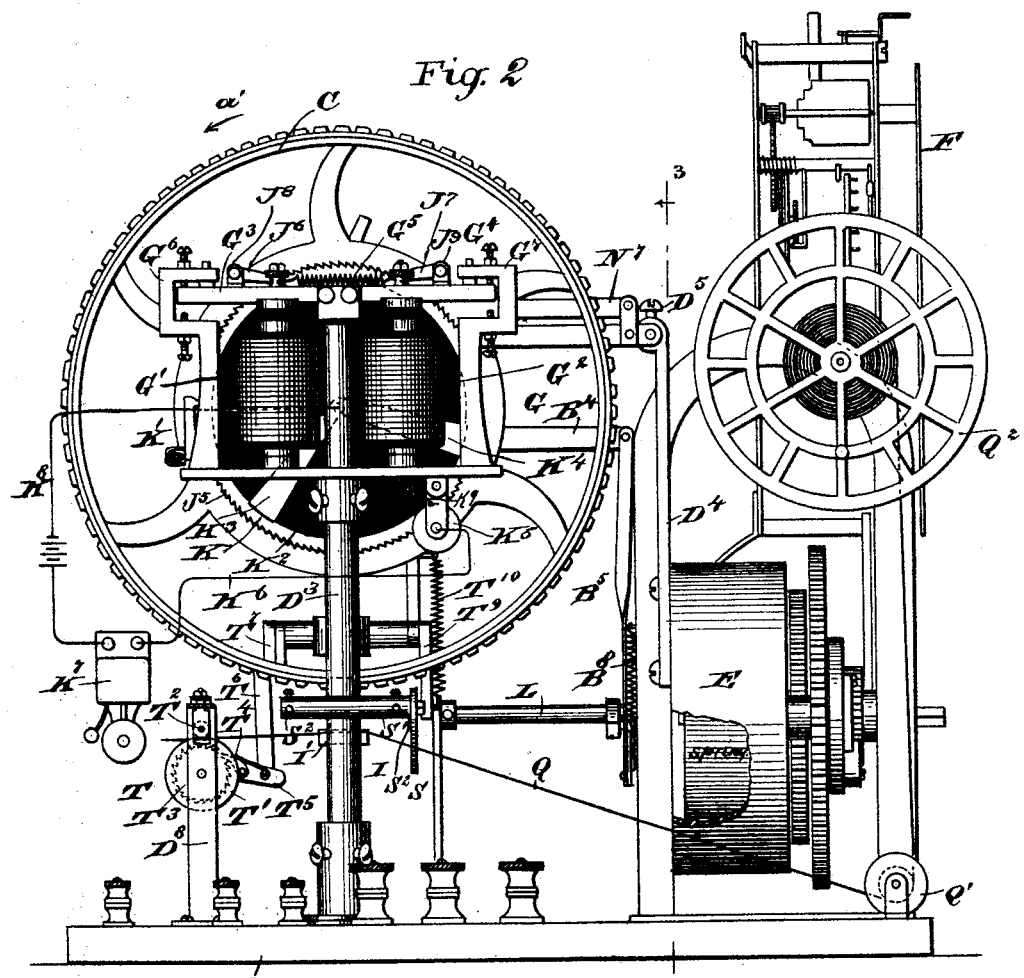
Figure 9:
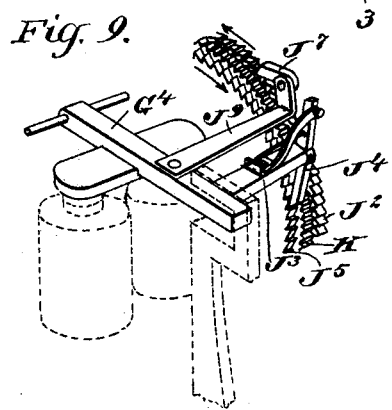
Figure 3:
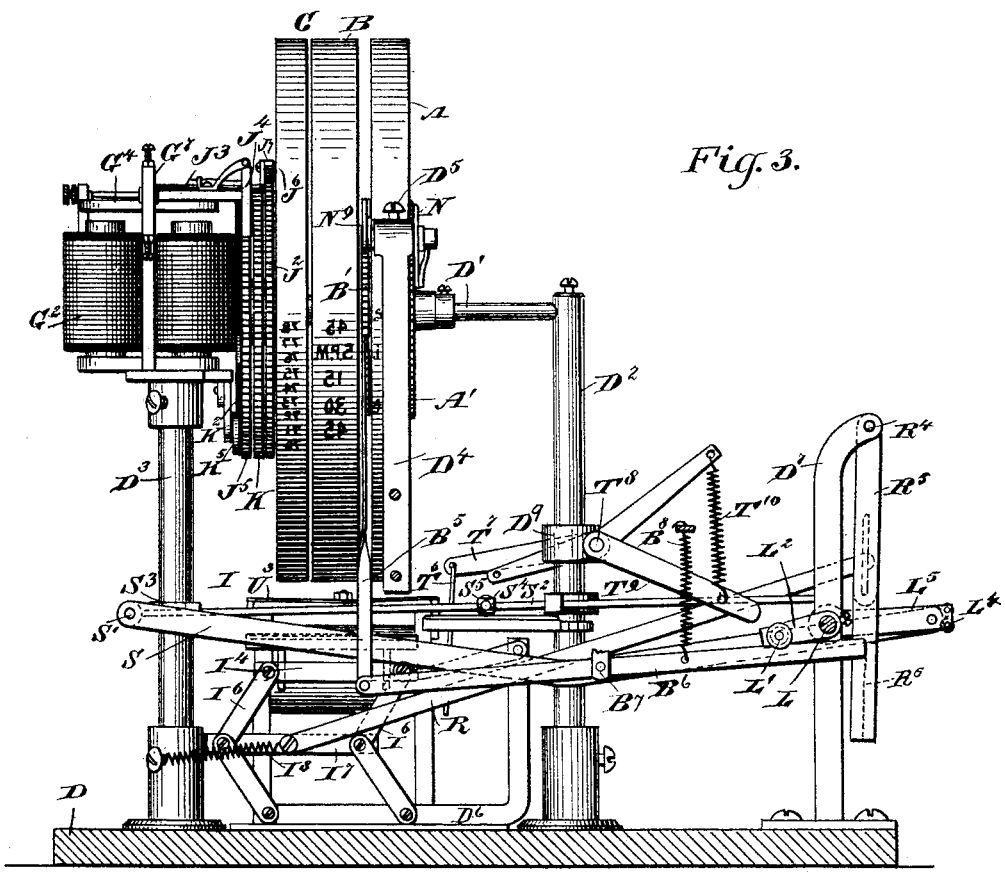
Figure 12:
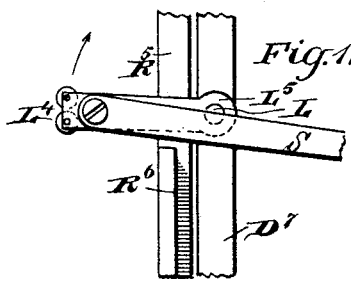
Figure 14:
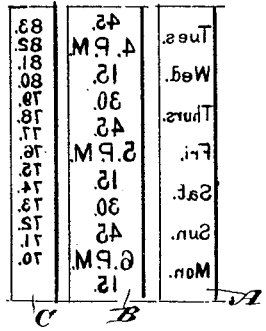
Figure 13:
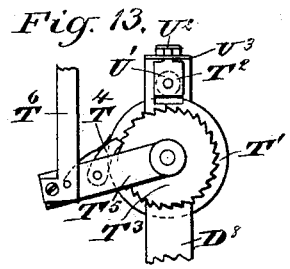
Figure 15:
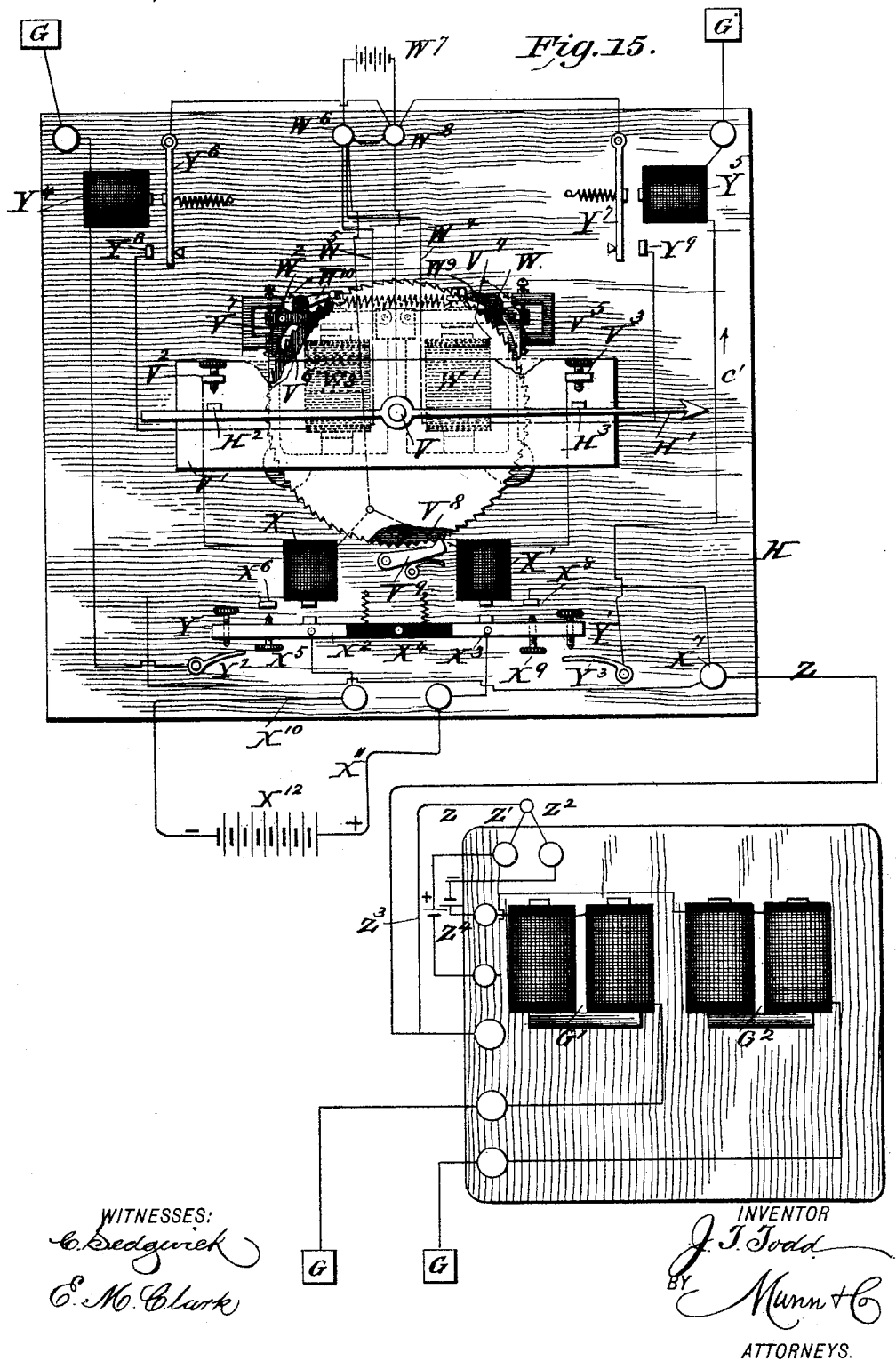

Figure 1 is a plan view of the invention. Fig. 2 is a side elevation of the same. Fig. 3 is a transverse section of the same on the line 3—3 in Figs. 1 and 2. Fig. 4 is a perspective view of the recording receiver and adjacent devices. Fig. 5 is a sectional front view of part of the motor for actuating the recording receiver. Fig. 6 is a perspctive view of the tripping mechanism of the same. Fig. 7 is a like view of the releasing mechanism for the tripping device. Fig. 8 is a sectional side elevation of the platen for the recording receiver. Fig. 9 is a perspective view of the mechanism for actuating the type wheel controlled from one of the electro-magnets. Fig. 10 is a perspective view of the mechanism for shifting the date type wheel. Fig. 11 is a transverse section of part of the type wheel and part of the device for shifting the date wheel. Fig. 12 is a side elevation of the main crank arm for the receiver. Fig. 13 is a side elevation of the paper feed. Fig. 14 is an enlarged plan view of part of the type wheels; and Fig. 15 is a plan of the transmitter used in connection with the electro-magnets for actuating one set of type wheels.

The improved telemeter is provided with a recording-receiver comprising a series of type wheels A, B, and C, arranged alongside each other and mounted to rotate loosely on a shaft $D'$ supported on posts $D^2$ and $D^3$ erected on the base D on which the entire machine is mounted. The type wheels are preferably of the same diameter and carry on their peripheries type characters, see Fig. 14, of which the type characters on the wheel A indicate the days of the week arranged successively, thus making the wheel A the date wheel, while the wheel B is the time wheel and carries on its periphery type characters indicating the time of the day, preferably quarter hours for all the twenty-four hours of the day. The type wheel C is provided with type characters corresponding to the nature of the force or agent for which the recorder is used, usually, however, successive numerals indicating, say degrees, if variations of temperature are to be recorded, or feet for the height of the water in the boiler, or pounds for the pressure in the boiler, &c. The type characters of the several wheels stand in alignment at the bottoms of the wheels, so that an impression on paper taken at this point reads the day, the quarter hour of that day, and the temperature, pressure, &c., of the force or agent at that particular time.

The wheel A is shifted the distance between two type characters by the time wheel B on the completion of every revolution of the latter, which time wheel is shifted every quarter hour by a spring actuated gearing or motor E tripped every quarter hour by a clockwork F of any approved construction.

The outer or force recording type wheel C is actuated by two pairs of electro-magnets $G'$, $G^2$ controlled by means of a transmitter H, preferably of the construction illustrated in Fig. 15 and hereinafter described.

The impression on paper is taken at or from the bottoms of the type wheels A, B, and C, by a suitable platen or impression I hereinafter more fully described.

As illustrated in Figs. 1, 2, and 3, the electro-magnets $G'$ $G^2$ are employed for actuating the type wheels C and in turn are actuated from the transmitter, according to the rise or fall of the temperature, or the rise or fall of the water, &c.; the electro-magnet $G'$, when actuated, imparting a rotary motion to the type wheel C in one direction, while a motion in the opposite direction is given to the said type wheel at the time the other electro-magnet $G^2$ is actuated by pawl and ratchet mechanisms to be presently described. The electro-magnets $G'$ and $G^2$ are provided with armature levers $G^3$ and $G^4$ respectively, pivoted on the upper end of the post $D^3$, which also forms a support for the magnets $G'$ and $G^2$, as will be readily understood by reference to Figs. 2 and 3. A spring $G^5$ connects the two armature levers $G^3$ and $G^4$ with each other, to hold the same in a normal position; that is, out of contact with their respective electro-magnets $G'$ and $G^2$, which movement by the levers will also hold the pawls carried thereby out of engagement with the respective ratchet wheels as hereinafter more fully set forth. The outer ends of the armature levers $G^3$ and $G^4$ are limited in their swinging motion by the usual stops $G^6$ and $G^7$ supported on the frame carrying the electro-magnets $G'$ and $G^2$. On the armature lever $G^3$ is secured a transversely extending arm $J$, carrying a spring-pressed pawl $J'$ see Fig. 1 engaging a ratchet wheel $J^2$ secured to the outer face of the type wheel $C$, so that when the armature lever $G^3$ is attracted by its electro-magnet $G'$, the said spring-pressed pawl $J'$ acts on the ratchet wheel $J^2$ and thus turns the type wheel $C$ in the direction of the arrow $a'$ on Fig. 2. On the other armature lever $G^4$ is arranged an arm $J^3$ carrying a spring-pressed pawl $J^4$ engaging a ratchet wheel $J^5$, also secured on the hub of the type wheel $C$, see Figs. 1, 3 and 9 so that when this armature lever $G^4$ is attracted by its electro-magnet $G^2$ the said pawl $J^4$ actuates the ratchet wheel $J^5$, so as to impart a rotary motion to the type wheel $C$ in the inverse direction of the arrow $a'$, since the teeth of the ratchet wheels $J^2$ $J^5$ are oppositely arranged.

In order to prevent the type wheel $C$ from being moved too far in either direction by the respective pawls and ratchet wheels above described, I provide the pawls $J^6$ and $J^7$, see Figs. 1, 2, and 9, secured rigidly on the arms $J^8$ and $J^9$ respectively, projecting from the armature levers $G^3$ and $G^4$ respectively, and adapted to engage the ratchet wheels $J^5$ and $J^2$ respectively, whenever the corresponding armature lever $G^3$ or $G^4$ is attracted. Thus when, for instance, the armature lever $G^3$ is attracted by its magnet $G'$, the pawl $J'$ moves the ratchet wheel $J^2$ the distance between two teeth, and at that time the downward movement of the armature lever $G^3$ has moved the fixed pawl $J^6$ in contact with the ratchet wheel $J^5$, the teeth of which stand in an opposite direction to those of the ratchet wheel $J^2$, and hence a farther forward movement of the said ratchet wheels in the direction of the arrow $a'$ is prevented by the pawl $J^6$ engaging the ratchet wheel $J^5$. In a like manner the other fixed pawl $J^7$ engages and locks the ratchet wheel $J^2$ after the pawl $J^4$ has turned the ratchet wheel $J^5$ in the direction of the arrow $a'$ the distance between two teeth at the time the armature lever $G^4$ has been attracted by its electro-magnet $G^2$.

In order to prevent the type wheel $C$ from being shifted accidentally I provide the toothed wheel $K$ engaged by a spring-pressed pawl $K'$, see Figs. 1 and 2 the said toothed wheel having V-shaped grooves to permit the pawl to glide over the teeth in either direction in which the wheel may be turned, but the said pawl, by pressing on the said ratchet wheel, prevents the type wheel from being accidentally moved in either direction owing to jars or other disturbing cause. The pawl also serves to finally bring the type wheel $C$ into such position as to hold the type into proper alignment for printing.

In case a danger point is reached; that is, the steam or other force rises beyond or falls below a certain degree; then an alarm is sounded, and for this purpose the force-recording wheel $C$ has secured to the outer face of its ratchet wheel $J^5$ a concentric insulating disk $K^2$ made of rubber or other insulating material, and on this disk are attached two sectoral arms $K^3$ and $K^4$ between which is arranged a roller $K^5$ journaled in an arm pivoted to the frame for the electro-magnets, as will be readily understood by reference to Fig. 2. The roller $K^5$ engages on the periphery of the disk $K^2$, and when the type wheel $C$ is turned far enough in either direction the respective arm $K^3$ or $K^4$ comes in contact with the said roller $K^5$. The roller $K^5$ is connected by the wire $K^6$ with an alarm $K^7$ of any approved construction, actuated by a local battery connected by a wire $K^8$ with the said arms $K^3$ and $K^4$ at their junction in the center of the web $K^2$. The periphery of each segmental arm extends sufficiently beyond the periphery of the non-conducting web $K^2$ to insure electrical contact with roller $K^5$; and as these segments project but slightly beyond the web $K^2$ they do not prevent the further turning of type wheel $C$ should the temperature still continue in that direction. The width of the segmental arms of course determines the length of time that the alarm is sounded. Now, it will be seen that when the wheel $C$ is shifted in the direction of the arrow $a'$ to a danger point, then the arm $K^3$ comes in contact with the roller $K^5$, so that the circuit for the alarm $K^7$ is completed by the said arm making connection with the roller $K^5$. When the type wheel $C$ moves too far in the inverse direction of the arrow $a'$, then the other arm $K^4$ moves in contact with the roller $K^5$, thus again completing the circuit and sounding the alarm $K^7$. The arm carrying the roller $K^5$ is provided with a spring $K^9$, as shown in Fig. 2, so as to hold the said roller always in frictional contact with the insulating web or disk $K^2$.

In order to impart an intermittent rotary motion to the time wheel $B$ in the direction of the arrow $a'$, the following device is provided, especial reference being had to Figs. 1, 2, 3, 4, and 5:—On the hub of the time wheel $B$ is secured a ratchet wheel B' engaged by a pawl B² pressed on by a spring B³ and fulcrumed on an arm B⁴ having its fulcrum on the fixed shaft D', on which the type wheels are mounted to rotate, as previously stated. The free end of the arm B⁴ is pivotally connected by a link B⁵ with a lever B⁶, fulcrumed on the bracket B⁷ attached to the main frame. The outer, free end of the lever B⁶ is engaged by a friction roller L' held on a crank arm L² attached to the main driving shaft L, mounted to turn in suitable bearings supported from the base D. A spring B⁸ pulls on the lever B⁶ so as to hold its free end in contact with the friction roller L' during part of the revolution of the shaft L. When the latter has rotated in the direction of the arrow $b'$, Fig. 4 then the crank arm L², by its friction roller L', depresses the free end of the lever B⁶, so that the other end of the latter swings upward and, by the link B⁵, imparts an upward swinging motion to the arm B⁴, whereby the spring-pressed pawl B² turns the ratchet wheel B' and consequently the time wheel B, so as to bring the next type character thereon into the proper position for taking the next impression at the bottom of the wheel. As soon as the friction roller L' has left the free end of the lever B⁶, the latter at once returns to its normal position by the action of the spring B⁸, the free end of the said lever resting against the under side of the main driving shaft L, see Fig. 4. When the shaft L has made its complete revolution in the direction of the arrow $b'$ Fig. 4 it again stops at the time the friction roller L' again moves in contact with the top edge of the lever B⁶, as shown in the said Fig. 4.

The shaft L carries a pinion E' see Fig. 5, which forms one of the gear wheels of the motor gearing E actuated by a spring or weight in the usual manner, so that further description of this device is not deemed necessary, as any other suitable motor may be employed to impart a rotary motion to the shaft L.

In order to impart a rotary motion to the date wheel A at every revolution of the time wheel B, I provide a mechanism N shown in detail in Figs. 10 and 11. This device N is provided with a pin N' projecting from the web of the time wheel B, the said pin engaging, at every revolution of the wheel B, an arm N², attached on a shaft N³ journaled in a frame N⁴ held adjustably on a bracket D⁴ supported from the base D or other parts forming the main frame. A set screw D⁵ permits of adjusting the frame N⁴ so as to hold said frame and the parts thereon in the proper position. On the shaft N³ is secured an arm N⁵ carrying at its front end a spring-pressed pawl N⁶, engaging a ratchet wheel A' secured on the hub of the date wheel A to turn said date wheel one tooth at a time. The swinging movement of the arm N⁵ is limited by a stop bracket N⁷, held adjustably on the frame N⁴. Spring-pressed pawls N⁸ and N⁹ are held on the frame N⁴ and engage the ratchet wheels A' and B' respectively, to prevent a return movement of the date and time wheels A and B. Now, when the time wheel B is given a complete revolution, then the pin N' engages the arm N², thus lifting the latter, and thereby causing the shaft N³ to turn, whereby the arm N⁵ swings upward, and by the pawl N⁶ imparts a turning motion to the ratchet wheel A' and consequently to the date wheel A. The arm N², after each revolution of the wheel B, drops off the pin N', so that the latter, as well as the arm N⁵, returns to its lowermost position by the action of a spring N¹⁰ pressing on the said arm N⁵. On the downward motion of the arm N⁵ the pawl N⁶ glides over the ratchet wheel A', a return movement of which as well as of the ratchet wheel B' being prevented by the pawls N⁸ and N⁹ previously mentioned. The date wheel A is shifted by this mechanism N one tooth so that the next following type character is brought into a lowermost position at the bottom of the wheel for the next impression, and this change takes place once every twenty-four hours.

In order to release the main driving shaft L at a predetermined, desired time, and permit it to be driven from the motor E in this case every quarter of an hour, the following device is provided:—On the main driving shaft L is secured an arm L³, adapted to be locked in position by a device O shown in detail in Fig. 6. This device O is provided with a lever O', arranged vertically and fulcrumed on a bracket O², attached to the frame work carrying the motor or gearing E. On the lower end of this lever O' is arranged a pin O³ adapted to move into the path of the arm L³ so as to lock the latter in position. A spring O⁴ holds the lever O' in this normal position, the lever resting with its upper end against the set screws O⁵ screwing into the bracket O². Now, in order to disengage the pin O³ from under the free end of the arm L³, the upper end of the said lever is struck every quarter of an hour by a striker P' held on an arm P controlled from the clockwork F. Thus, when the striker P' strikes against the upper end of the lever O' the lower end of the said lever swings in an opposite direction, thus moving the pin O³ from under the arm L³, so that the latter and the main shaft L are unlocked to permit the motor or gearing E to rotate the said shaft, to actuate the various mechanism connected with the shaft. The lever O' is returned soon after the release of the arm L³ by the action of the spring O⁴ forcing the upper end of the lever back against the set screw O⁵. The pin O³ then again stands in the phat of the arm L³, so that when the shaft L has made a complete revolution the free end of the arm L³ again strikes upon the pin O³, and further rotation of the shaft is prevented.

The striker arm P is secured on a shaft P² forming part of the clockwork F, which latter is provided on its hour shaft F', see Fig. 7, with a cam wheel F² formed with four notches adapted to alternately actuate a releasing lever $F^3$ for actuating the mechanism connected with the striker arm P. It will be seen that on every full revolution of the hour shaft $F'$ the cam wheel $F^2$ actuates the lever $F^3$ four times, so that the striker arm P is actuated four times in one hour, whereby the shaft L is unlocked a like number of times and the other parts co-operating therewith are correspondingly modified.

As the striker $P'$ does not have to perform any additional work to that which it usually performs in a clock work viz: striking a blow at stated intervals the time keeping qualities of the clock will not be impaired thereby in the slightest degree.

If it is desired to actuate the shaft L every ten minutes instead of every fifteen minutes, as shown, then the number of notches in the cam wheel F is increased to six, so that at every hour the six notches of the cam wheel actuate the lever $F^3$ six times, and the striker arm P is set in motion a like number of times to strike the lever $O'$ as above described, to release the arm $O^3$, so that the shaft L is then rotated six times in one hour. If it should be desired to actuate the shaft L every minute the cam wheel $F^2$ would be provided with sixty notches. The shaft L also actuates the platen or impression mechanism I, which latter is provided for this purpose with a platen $I'$ carrying on its top a paper guide $I^2$ through which passes the paper Q on which the impression is to be made, between the two arms of the guide $I^2$, see Figs. 2 and 8. The paper Q is in the shape of a roll and unwinds from the reel $Q^2$ to pass under a roller $Q'$ journaled on the base D, and then passing under the guide $I^2$ over the platen $I'$ to receive the impression while on that part of the platen extending between the two arms of the guide $I^2$.

In order to adjust the platen $I'$ to the proper position relative to the type characters on the type wheels A, B, and C, the said platen is provided with downwardly extending rods $I^3$ held vertically adjustable in a bar $I^4$ by means of set screws $I^5$ screwing in the said bars. By loosening the set screws the platen can be raised or lowered so as to bring the paper in the proper position to make a good impression on the under sides of the type wheels. The platen $I'$, when in a normal position, is a suitable distance below the bottoms of the type wheels so as not to interfere with the rotation of the type wheels, as above described. In order to raise the platen when the shaft L is actuated at every quarter hour or other time, as above described, the bar $I^4$, carrying the platen, is mounted on toggle levers $I^6$ pivoted at their lower ends on a bar $D^6$ attached to the base D, as will be readily understood by reference to Figs. 3 and 4. The toggle levers are pivotally connected with each other at their middle by a bar $I^7$ on which pulls a spring $I^8$ connected with the post $D^3$ so as to hold the said bar $I^7$ in contact at one end with the said post $D^3$ in order to hold the platen $I'$ in a lowermost position. The bar $I^7$ is pivotally connected with a link R connected with an arm $R'$, mounted to turn on a stud $R^4$ held on a bracket $D^7$ secured to the base D. In order to adjust the pivot end of the lever R on the arm $R'$, the pivot $R^2$ is held adjustably in a slot $R^3$ in the said arm $R'$. From the hub of the pivoted arm $R'$ extends downward a second arm $R^5$, provided on one face with an offset $R^6$, see Fig. 12, adapted to be engaged by friction rollers $L^4$ journaled at the outer ends of a crank arm $L^5$ attached to the shaft L. Thus when the latter rotates, as previously described, the crank arm $L^5$, in the course of its revolution, strikes the lug $R^6$ so as to impart an outward swinging motion to the arm $R^5$ and consequently to the arm $R'$, whereby the latter exerts an outward pull on the link R connected with the bar $I^7$ which thus is moved forward and forces an opening of the toggle levers $I^6$, which opening raises the platen $I'$ and thus moves the paper in contact with the type on the type wheels A, B, and C, to make the impression. Shortly before the shaft L has completed its revolution, the friction rollers $L^4$ drop off the upper end of the projection or offset $R^6$, so that the toggle levers $I^6$ again close by the action of the spring $I^8$ pulling on the bar $I^7$ until the latter abuts against the post $D^3$. This closing of the levers moves the platen $I'$ back into its normal lowermost position, as before stated, to permit a further changing of the type wheels. It will thus be seen that the platen $I'$ is raised suddenly to make the impression and then at once drops back into its normal position, so as not to interfere with the free rotation or change of position of the type wheels A, B, and C.

In order to ink the lowermost type of the type wheels A, B, and C previous to making the impression as above described, the following device is provided: The crank arm $L^5$ previously mentioned is pivotally connected by a pitman S with a bar $S'$ connecting two rods $S^2$ with each other at one end, the said rods $S^2$ being mounted to slide in bearings $S^3$ secured to the posts $D^2$ and $D^3$, see Fig. 4. The rods $S^2$ extend under the type wheels and between the same passes the platen $I'$. On the rods $S^2$ are secured collars $S^4$ arranged opposite each other, and in which is journaled an inking roller $S^5$ adapted to travel over the ink-supplying pad $S^6$ supported from the bar $D^6$, or other suitable support erected on the base D. The ink-supplying pad $S^6$ is arranged between the rods $S^2$ in front of the platen $I'$, as will be readily seen by reference to Fig. 4. When the shaft L is in its locked position, as shown in the said figure, the shank arm $L^5$ stands outward, whereby the inking roller $S^5$ is held in a rearmost position on the pad $S^6$. Now, when the shaft L is rotated as above mentioned, the crank arm $L^5$ pushes on the pitman S, so that the bar $S'$ and the rods $S^2$ carrying the said inking roller $S^5$ move outward, whereby the said inking roller rolls on the inking pad, takes up the necessary ink, and finally passes over the lowermost type of the type wheels A, B, and C, and back again to ink the same thoroughly on the return stroke of the crank arm $L^5$. When the crank arm $L^5$ is on its return stroke and just previous to engaging, with its friction rollers $L^4$, the projection $R^6$ on the arm $R^5$, then the inking roller $S^5$ has returned upon the pad $S^6$, and during the remainder of the movement of the crank arm $L^5$ the said inking roller moves to a rearmost position on the pad. As soon as the crank arm $L^5$ moves with its friction rollers $L^4$ in contact with the lugs $R^6$ on the arm $R^5$, the platen $I'$ is raised to make the impression on the freshly inked type on the bottoms of the type wheels A, B, and C.

Previous to raising the platen $I'$ to make the impression, the paper Q is fed forward and for this purpose the following feeding device T is provided, which is actuated from the crank arm $L^5$ of the shaft L:—The paper passes from the platen $I'$ between two rollers $T'$ and $T^2$, of which the larger, bottom roller $T'$ is journaled in suitable bearings fixed on a bracket $D^8$ supported on the base D. On the shaft of this roller $T'$ is secured a ratchet wheel $T^3$ engaged by a spring-pressed pawl $T^4$ fulcrumed on an arm $T^5$ mounted loosely on the shaft of the roller $T'$, see Fig. 13. The free end of this pivoted arm $T^5$ is pivotally connected by a link $T^6$ with an arm $T^7$ secured on a shaft $T^8$ journaled in a suitable bearing $D^9$ attached to the post $D^2$. On the shaft $T^8$ is secured a second arm $T^9$ extending in the path of the friction rollers $L^4$, so that when the crank arm $L^5$ is on its forward stroke, the said friction rollers engage the said arm $T^9$ and impart a downward swinging motion to the same so as to turn the shaft $T^8$, thereby causing an upward swinging motion of the arm $T^7$, which, by the link $T^6$, causes an upward swinging motion of the arm $T^5$ so that the friction pawl $T^4$ rotates the ratchet wheel $T^3$, thus turning the roller $T'$ and thereby feeding the paper held in the said roller $T'$ and the roller $T^2$ forward. The return movement of the arm $T^9$ and the several parts connected with the feed takes place after the friction rollers $L^4$ drop off the free end of the said arm $T^9$, the return movement being accomplished by a spring $T^{10}$ connected with the said arm $T^9$ attached to a bracket extending from the bearing $D^9$, see Figs. 3 and 4. It will be seen that this forward feeding of the paper takes place at the time the inking of the type on the type wheel occurs, but previous to the raising of the platen, as before described.

In order to hold the top roller $T^2$ in contact with the paper passing between the rollers so as to properly feed the paper forward, I provide bearings $U'$ for the said roller $T^2$, which are mounted to slide vertically in grooves arranged in the upper end of bracket $D^8$. The ends of the bearings $U'$ are pressed down by a spring $U^2$ attached at its middle to a cross bar $U^3$ connecting the upper ends of the two side bars of the bracket $D^8$. It will be seen that the spring plate $U^2$ presses the bearings $U'$ down so as to press the paper into sufficient frictional contact with the large roller $T'$ to cause the forward feeding of the paper when the roller $T'$ is revolved, as above described.

The transmitter H, illustrated in Fig. 15, is provided with a pointer $H'$, which is under the influence of the force or agent the state of which is to be recorded by the instrument. The pointer $H'$ is securely attached on a shaft V passing through a fixed sleeve on which rotates loosely a non-conducting plate $V'$ carrying contact points $V^2$ and $V^3$, insulated from each other and adapted to be engaged by contacts $H^2$ and $H^3$ on the said pointer $H'$. When the pointer $H'$ is deflected in the direction of the arrow $c'$, then the contact $H^3$ moves in contact with the contact point $V^3$, and when the said pointer is deflected in the inverse direction of the arrow $c'$, then the contact point $H^2$ moves in contact with the point $V^2$.

In order to immediately break the contact between the contact points $V^2$ $H^2$ above mentioned, the following device is provided: The plate $V'$ carries a ratchet wheel $V^4$ engaged by a spring-pressed pawl $V^5$ held on the armature lever W of an electro-magnet $W'$, which when attracting the said armature lever, causes the pawl $V^5$ to turn the wheel $V^4$ so as to turn the plate $V'$ in the inverse direction of arrow $c'$, thus moving the plate $V'$ out of contact by its contact point $V^2$ with the contact point $H^2$ of the pointer $H'$. In order to break the contact between the points $H^3$ and $V^3$ a second ratchet wheel $V^6$ having its teeth standing in an opposite direction to that of ratchet wheel $V^4$ is secured on plate $V'$ and engaged by a spring-pressed pawl $V^7$ held on an armature lever $W^2$ of an electro-magnet $W^3$, which when attracting the said armature lever $W^2$, causes its pawl $V^7$ to turn the ratchet wheel $V^6$ and consequently the plate $V'$ so as to move the plate $V'$ in the direction of the arrow $c'$, and consequently the contact point $V^3$ out of contact with the point $H^3$.

In order to hold the shaft V in a normal position; that is, the contact points $V^2$ and $V^3$ out of engagement with the respective contact points $H^2$ and $H^3$, a notched wheel $V^8$ is provided secured on the plate $V'$ and engaged by a spring-pressed pawl $V^9$ having a V-shaped tooth, so as to permit of rotating the plate $V'$ in either direction when the wheels $V^4$ and $V^6$ are actuated by their spring-pressed pawls. When the magnets $W'$ and $W^3$ are not vitalized their pawls $V^5$ and $V^7$ respectively held on the armatures, are out of contact with their respective ratchet wheels $V^4$ and $V^6$, the pawl $V^9$ always pressing its ratchet wheel $V^8$ thus holding plate $V'$ in its normal position and preventing any jar from throwing plate $V'$ out of position.

The action of the armature levers W, $W^2$ and their pawls $V^5$ $V^7$, on the ratchet wheels $V^4$ $V^6$ and the action of pawl $V^9$ on ratchet wheel $V^8$ corresponds exactly with the action of the levers $G^3$ $G^4$ and their pawls $J'$ $J^4$ upon ratchet wheels $J^2$ and $J^5$ and of the pawl $K'$ on wheel K. The three ratchet wheels $V^4$ $V^6$ $V^8$ are connected to the turn table or plate $V'$ for operating it just as are the ratchet wheels $J^2$ $J^5$ and K to the wheel C and all of the said ratchet wheels are of the same size and have the same number of teeth.

The locking pawls $W^9$ $W^{10}$ on the levers W $W^2$ correspond in action with the pawls $J^6$ $J^7$ of armature levers $G^3$ $G^4$.

The electro-magnets $W'$ and $W^3$ are connected by the wires $W^4$ and $W^5$ with a binding post $W^6$, connected with a local battery $W^7$ connected with a binding post $W^8$ connected with armatures $Y^6$ and $Y^7$. The binding post $W^6$ is also connected with the electro-magnets X and $X'$, connected with contact points $V^2$ and $V^3$ respectively, as is plainly shown in the drawings Fig. 15. The electro-magnets X and $X'$ are adapted to attract the insulated ends $X^2$ and $X^3$ of an armature lever $X^4$ fulcrumed at the middle so that when one end is moved in contact with its respective electro-magnet, the other end moves farther away from its electro-magnet. On the end $X^2$ of the armature lever $X^4$ for the electro-magnets X and $X'$, is secured a contact screw $X^5$ adapted to make contact on a point $X^6$ at the time the end $X^2$ is attracted by its magnet X, the said contact point $X^6$ being connected with a binding post $X^7$ connected by a wire Z with the electro-magnets $G'$ $G^2$ of the receiver, as hereinafter more fully described. The other arm $X^3$ of the armature lever $X^4$ carries a contact screw $X^9$ adapted to make contact on a point $X^8$ at the time the electro-magnet $X'$ attracts the end $X^3$. This contact point $X^8$ is also connected with the binding post $X^7$, as shown. On the ends $X^2$ and $X^3$ of the armature lever $X^4$ are secured the contact screws Y and $Y'$ respectively, adapted to make contact on the springs $Y^2$ and $Y^3$ respectively, connected with the electro-magnets $Y^4$ and $Y^5$ respectively, adapted to attract the armature levers $Y^6$ and $Y^7$ respectively, connected with the binding post $W^8$, as shown. The electro-magnets $Y^4$ and $Y^5$ are connected with the ground G. The contact screws Y and $Y'$ are arranged in such a manner that when the lever end $X^2$ is attracted by its magnet X, then the contact screw $Y'$ on the other end $X^3$ makes contact with the spring plate $Y^3$, and when this end $X^3$ is attracted by its magnet $X'$, then the other contact screw Y makes contact with the spring plate $Y^2$. The ends $X^2$ and $X^3$ of the armature lever $X^4$ are connected with the negative and positive poles respectively of the battery $X^{12}$ by wires $X^{10}$ $X^{11}$; see Fig. 15. The electro-magnets $G'$ and $G^2$ are connected with the ground in the usual manner.

The operation is as follows: When the pointer $H'$ is influenced so as to deflect in the direction of the arrow $c'$, then the point $H^3$ makes contact with the point $V^3$, whereby a local circuit is established from the battery $W^7$ and the electro-magnet $X'$ to attract the end $X^3$ of the armature lever $X^4$. By doing so the end $X^3$ makes contact with its screw $X^9$ on the point $X^8$, so that a positive current of electricity is sent from the battery $X^{12}$ to the line Z, and from the latter by the wire $Z^2$ to the negative pole of the battery $Z^4$, so that the set of magnets $G'$ attract their armature lever $G^3$, to cause the turning of the wheel C in the direction of the arrow $a'$, as before described. Just previous to the end $X^3$ of the lever $X^4$ making contact with its screw $X^9$ on the point $X^8$, the opposite end $X^2$ of the armature $X^4$ comes in contact with the spring plate $Y^2$ which will give or spring back sufficiently to permit the armature end $X^3$ to make contact with its screw $X^9$. The object of these spring plates $Y^2$ and $Y^3$ is to insure the connection through the magnets $Y^4$ or $Y^5$ at the time the opposite end of the armature comes in contact with the fixed point of contact. Should one end of the armature reach the fixed contact point before the opposite end reaches the spring plate, then there could be no connection made. After this contact has been made the other end $X^2$ of the armature lever $X^4$ makes contact with its set screw Y and the plate $Y^2$, so as to complete the circuit of the battery $X^{12}$ by way of the magnet $Y^4$, which latter thus attracts its lever $Y^6$ and the local circuit is established as soon as the lever $Y^6$ touches the contact point $Y^8$. This circuit of the local battery $W^7$ passes through the electro-magnet $W^3$, thereby attracting the lever $W^2$, so as to cause the pawl $V^7$ to act on the ratchet wheel $V^6$, to turn the plate $V'$ in the direction of the arrow $c'$, thus moving the contact point $V^3$ out of contact with the point $H^3$ on the pointer $H'$. The current is thus broken and the pulsation to the electro-magnets $G'$ ceases. When the pointer $H'$ is influenced in the inverse direction of the arrow $c'$, then contact is made between the points $H^2$ and $V^2$ and the above described operation is repeated, with the difference, however, that a negative pulsation is sent to the line Z, which negative pulsation passes through the wire $Z'$ to the positive pole of the battery $Z^3$ connected with one set of the electro-magnets $G^2$, which attract their armature levers $G^4$ so as to rotate the wheel C in the inverse direction of the arrow $a'$, as above described.

The batteries $Z^3$ and $Z^4$ must be sufficiently small or weak so as not to overcome the resistance of the earth between the two ground wires at the recorder, for were these batteries of sufficient strength to overcome the earth's resistance between the ground wires, then a short circuit would be established through both magnets $G'$ and $G^2$, causing their respective armatures to continue to act on the force recording type wheel C.

It is understood that the action of the transmitter changes, by means of the sets of electro-magnets G' and G², the position of the type wheel C according to the state of the force or agent to be measured, so that the corresponding degrees of temperature, or pressure in pounds, or otherwise is then at the bottom of the wheel in aligment with the exact time indicated by the time wheel and with the day indicated by the date wheel. Thus, when the next impression is made, as before described, the matter printed on the paper Q indicates the day, the time, and the state of the agent at that time. Thus it will be seen that a complete record for any desired length of time is kept of the doings or changes which take place in the agent under observation.

When it is desired to record from two or more agents or forces, additional type wheels may be added and placed on the same shaft, each type wheel so added being controlled independently of the others, and have the electric connections with the transmitter. When this is done (using more than one temperature wheel) it would be advisable to operate them from ratchet wheels working in the type wheels, at their edges, so that the type wheels may be placed as close to each other as possible and using the same paper to print on. In this arrangement the magnets for each wheel can be so distributed around the wheels as to permit the type wheels to be placed side by side.

Having thus described my invention, I claim as new and desire to secure by Letters Patent—

1. A recording-receiver, comprising a wheel, for recording the state of the force or agent electro magnets for turning the wheel in opposite directions and controlled by the variations of said force or agent, a time wheel, a motor for rotating the time wheel, a separate and independent time mechanism or clock work, a releasing mechanism operated from said time mechanism at regular intervals to permit the motor to turn the time wheel, a date wheel operated from the time wheel, and means for making an impression from the said three wheels, substantially as described.

2. A recording receiver, comprising a wheel for recording the state of the force or agent, electro magnets for turning the wheels in opposite directions and controlled by the variations of said force or agent, a time wheel a main shaft a motor for operating the main shaft, a time or clock mechanism separate and independent of said motor for releasing the main shaft at stated intervals for operation by said motor, a date wheel operated from the time wheel, an impression or platen mechanism to make an impression from said three wheels, and operative connections between the main shaft and the time wheel and impression mechanism, substantially as described.

3. The combination with the force recording wheel, of electro magnets, pawl and ratchet mechanisms connected with the said wheel to turn it in opposite directions and operated from the armatures of the said magnets, insulated arms secured to said wheel, a contact in the path of both arms, an electrical circuit completed by the engagement of either of said arms with the said contact, and an alarm in the said circuit, substantially as described.

4. The combination with the force-recording wheel and the electro magnets and pawl and ratchet mechanisms for operating it, of the disk concentric with the said wheel, and turning therewith and formed of insulating material, the sectoral arms carried by the disk with their outer ends at the periphery of the disk, a yielding contact engaging the periphery of the disk to engage the outer ends of said arms, and an electric circuit containing an alarm and completed by the engagement of either of the arms with said contact, substantially as described.

5. The combination with the force recording wheel and the electro magnet and pawl and ratchet mechanisms for operating the wheel, of a disk of insulating material concentric with and turning with said force wheel, sectoral arms mounted on the disk with their outer ends at the periphery of the disk, a spring pressed contact wheel bearing on the periphery of the disk, and an electric alarm the circuit of which is completed by either of the arms contacting with said wheel, substantially as described.

6. The combination with the force wheel having two ratchet wheels provided with oppositely projecting teeth, of armatures controlled from the force or agent being recorded, oppositely projecting armature levers each provided at its outer end with a pivoted and a rigidly secured pawl the rigid pawl of one lever engaging the same ratchet as the pivoted pawl of the opposite lever, substantially as described.

7. In a telemeter, the combination with a transmitter, and sets of electro-magnets controlled from the said transmitter according to the positive and negative pulsations sent to the said magnets, of a type wheel actuated from the said electro-magnets and provided with type characters for indicating the state of the agent controlling the transmitter, a time wheel arranged alongside the said type wheel, and an impression or platen mechanism for making impressions from the type characters of the said wheels, substantially as shown and described.

8. In a telemeter, the combination with a transmitter and sets of electro magnets controlled from the said transmitter according to the positive and negative pulsations sent to the said magnets, of a type wheel actuated from the said electro-magnets and provided with type characters for indicating the state of the agent controlling the transmitter, a time wheel arranged alongside the said type wheel, an impression or platen mechanism for making impressions from the type characters of the said wheels, and a clockwork for controlling the said time wheel, substantially as shown and described.

9. In a telemeter, the combination with a transmitter and sets of electro-magnets controlled from the said transmitter, according to the positive and negative pulsations sent to the said magnets, of a type wheel actuated from the said electro-magnets and provided with type characters for indicating the state of the agent controlling the transmitter, a time wheel arranged alongside the said type wheel, an impression or platen mechanism for making impressions from the type characters of the said wheels, a spring actuated gearing for operating the said time wheel and the said impression or platen mechanism, and a clockwork for controlling the said spring actuated gearing, substantially as shown and described.

10. In a telemeter, the combination with a transmitter and sets of electro-magnets controlled from the said transmitter according to the positive and negative pulsations sent to the said magnets, of a type wheel actuated from the said electro-magnets and provided with type characters for indicating the state of the agent controlling the transmitter, a time wheel arranged alongside the said type wheel, a date wheel controlled from the said time wheel, and an impression or platen mechanism for making impressions from the type characters of the said wheels, substantially as shown and described.

11. In a telemeter, the combination with a transmitter and sets of electro-magnets controlled from the said transmitter according to the positive and negative pulsations sent to the said magnets, of a type wheel actuated from the said electro-magnets and provided with type characters for indicating the state of the agent controlling the transmitter, a time wheel arranged alongside the said type wheel, a date wheel controlled from the said time wheel, an impression or platen mechanism for making impressions from the type characters of the said wheels, and a spring-actuated gearing for imparting movement to the said time wheel and the said printing mechanism, substantially as shown and described.

12. In a telemeter, the combination with a transmitter and sets of electro-magnets controlled from the said transmitter according to the positive and negative pulsations sent to the said magnets, of a type wheel actuated from the said electro-magnets and provided with type characters for indicating the state of the agent controlling the transmitter, a time wheel arranged alongside the said type wheel, a date wheel controlled from the said time wheel, an impression or platen mechanism for making impressions from the type characters of the said wheels, a motor or spring-actuated gearing for imparting movement to the said time wheel and the said impression or platen mechanism, and a paper feed actuated from the said motor or spring-actuated gearing and adapted to feed the paper over the platen of the said impression or platen mechanism, substantially as shown and described.

13. In a telemeter, the combination with a transmitter and sets of electro-magnets controlled from the said transmitter according to the positive and negative pulsations sent to the said magnets, of a type wheel actuated from the said electro-magnets and provided with type characters for indicating the state of the agent controlling the transmitter, a time wheel arranged alongside the said type wheel, a date wheel controlled from the said time wheel, an impression or platen mechanism for making impressions from the type characters of the said wheels, a motor or spring-actuated gearing for imparting movement to the said time wheel and the said impression or platen mechanism, a paper feed actuated from the said motor or spring-actuated gearing and adapted to feed the paper over the platen of the said impression or platen mechanism, and a clockwork for controlling the movement of the said spring-actuated gearing, substantially as shown and described.

14. In a telemeter, the combination with a transmitter and sets of electro-magnets controlled from the said transmitter according to the positive and negative pulsations sent to the said magnets, of a type wheel actuated from the said electro-magnets and provided with type characters for indicating the state of the agent controlling the transmitter, a time wheel arranged alongside the said type wheel, a date wheel controlled from the said time wheel, an impression or platen mechanism for making impressions from the type characters of the said wheels, a shaft having an intermittent rotary motion according to the predetermined time, intermediate mechanism for connecting the said shaft with the said date wheel to shift the latter at every revolution of the said shaft, and intermediate mechanism for connecting the said shaft with the impression or platen mechanism to actuate the latter, substantially as shown and described.

15. In a telemeter, the combination with a transmitter and sets of electro magnets controlled from the said transmitter according to the positive and negative pulsations sent to the said magnets, of a type wheel actuated from the said electro-magnets and provided with type characters for indicating the state of the agent controlling the transmitter, a time wheel arranged alongside the said type wheel, a date wheel controlled from the said time wheel, an impression or platen mechanism for making impressions from the type characters of the said wheels, a shaft having an intermittent rotary motion according to the predetermined time, intermediate mechanism for connecting the said shaft with the said date wheel to shift the latter at every revolution of the said shaft, intermediate mechanism for connecting the said shaft with the impression or platen mechanism to actuate the latter, and a paper feed actuated from the said shaft to feed the paper previous to making an impression from the type wheels, substantially as shown and described.

16. In a recording receiver, the combination with a date wheel and a time wheel controlling the motion of the said date wheel, of a shaft having an intermittent rotary motion, an intermediate mechanism for connecting the said shaft with the said time wheel to actuate the latter, a motor or spring-actuated gearing for imparting a rotary motion to the said shaft, a locking device for the said shaft, and a clockwork for tripping the said shaft locking mechanism to permit the motor or spring-actuated gearing to rotate the shaft at stated intervals, substantially as shown and described.

17. In a recording receiver, the combination with a motor or spring-actuated gearing and a main driving shaft operated from the said gearing, of an arm held on the said shaft, a locking lever having a pin engaging the said arm to lock the shaft in place, a tripping device for disconnecting the said lever and arm, and a clockwork actuating the said tripping device at predetermined intervals, substantially as shown and described.

18. A recording receiver, comprising a force-recording type wheel, controlled from the force or agent to be recorded, a time type wheel and a date type wheel controlled from the time wheel and a motor operating the time wheel at regular intervals and an impression mechanism also operated from said motor whenever the time wheel is operated, and comprising a platen movable toward and from the three wheels to carry the paper thereagainst, a toggle joint for operating the said platen, and a power connection for operating the toggle joint from the motor, substantially as described.

19. A recording receiver, comprising a force-recording type wheel controlled from the force or agent to be recorded, a time type wheel, a date type wheel operated therefrom, a main driving shaft operating the time wheel and operated at regular intervals, a time controlled motor for said shaft, a platen having an operating toggle mechanism actuated from said main shaft, and an inking mechanism also actuated from the main shaft and including a sliding frame provided with the inking roller for inking the type on said wheels, substantially as described.

20. A recording receiver, comprising a force-recording type wheel controlled from the force or agent to be recorded, a main drive shaft, a time controlled motor, for actuating the shaft at regular intervals, a date wheel, a time wheel operated from the main shaft and actuating the date wheel, a platen movable toward and from the type wheel, a paper feeding mechanism and an inking mechanism and operative connections between the main shaft, the platen and feeding and inking mechanisms for operating them in proper order, substantially as described.

21. In a recording receiver, the combination with a driving shaft having an intermittent rotary motion at stated intervals, and the type wheel actuated therefrom of a crank arm held on the said shaft and provided with friction rollers, an arm mounted to swing and provided with a lug adapted to be engaged by the friction rollers of the said crank arm, a second arm held on the shaft of the first named arm, a link pivotally connected with the said second arm, a bar pivotally connected with the said link, toggle levers connected with the said bar, and a platen supported on the said toggle levers, and movable thereby toward and from the said type wheel substantially as shown and described.

22. In a recording receiver, the combination with a driving shaft having an intermittent rotary motion at stated intervals, and the type wheels for respectively recording the variations in the force or agent, the time and the date, and connections between the time wheel and the said shaft, of a crank arm held on the said shaft and provided with friction rollers, an arm mounted to swing and provided with a lug adapted to be engaged by the friction rollers of the said crank arm, a second arm held on the shaft of the first named arm, a link pivotally connected with the said second arm, a bar pivotally connected with the said link, toggle levers connected with the said bar, a platen supported on the said toggle levers, and means, substantially as described, for vertically adjusting the said platen on the toggle levers, as set forth.

23. In a recording receiver, the combination with a driving shaft having an intermittent rotary motion at stated intervals of a crank arm held on the said shaft and provided with friction rollers, an arm mounted to swing and provided with a lug adapted to be engaged by the friction rollers of the said crank arm, a second arm held on the shaft of the first named arm, a link pivotally connected with the said second arm, a bar pivotally connected with the said link, toggle levers connected with the said bar, a platen supported on the said toggle levers, and a paper guide held on the said platen and under which passes the paper, substantially as shown and described.

24. In a telemeter a transmitter comprising a pointer under the control of the agent and provided with contact points, at opposite sides of its axis a plate concentric with the pointer, adapted to turn in opposite directions and carrying contact points at opposite sides of its axis adapted to be engaged and disengaged by the contact points of the said pointer, electro-magnets controlling spring pawls for shifting the said plate, and electro-magnets controlling the insulated ends of an armature lever for sending positive and negative pulsations through the line, substantially as shown and described.

25. In a telemeter, a transmitter comprising a pointer under the control of the agent and provided with contact points, a plate mounted to turn and carrying contact points adapted to be engaged and disengaged by the contact points of the said pointer, electro-magnets controlling spring pawls for shifting the said plate, electro-magnets controlling the insulated ends of an armature lever for sending positive and negative pulsations through the line, and a circuit breaker controlled from a local battery to disengage the said plate and its contact points from the contact points of the pointer, substantially as shown and described.

JOHN T. TODD.

Witnesses:
SCOTT BURGETT,
GEO. O. MOORE.